Aug. 31, 1926.
C. A. JARDINE
1,597,859
PRUNING SHEARS
Filed July 20, 1923
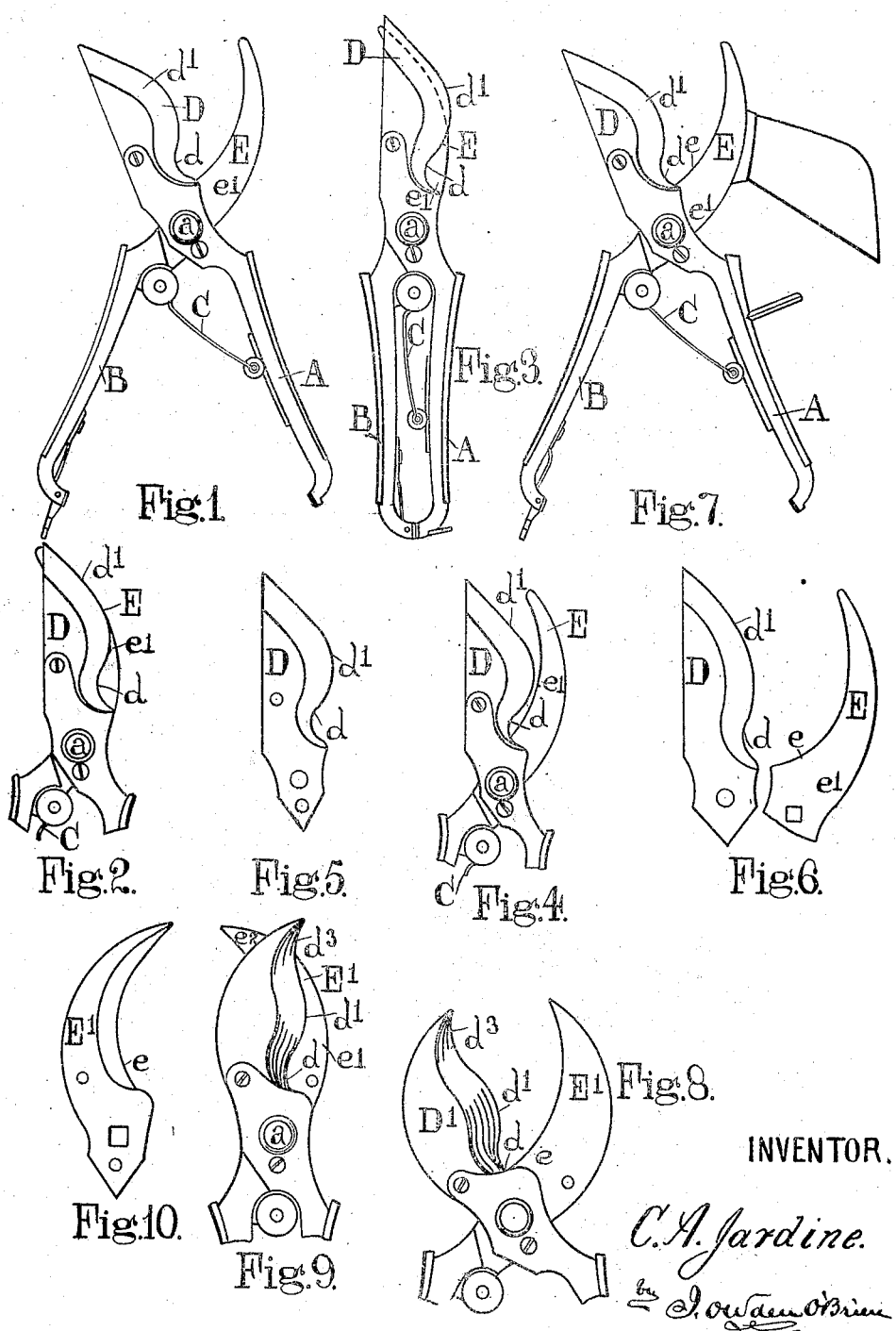
INVENTOR.
C. A. Jardine.

Patented Aug. 31, 1926.

1,597,859

UNITED STATES PATENT OFFICE.

CECIL ALBERT JARDINE, OF LONDON, ENGLAND.

PRUNING SHEARS.

Application filed July 20, 1923, Serial No. 652,849, and in Great Britain August 2, 1922.

This invention relates to pruning secateurs or shears as distinct from hedge shears or scissors such as are contructed with a convex cutting edge and a guard or blade with concave face against which the convex cutting blade acts or cuts.

In a horticultural sense secateurs are distinguished from ordinary shears by the fact that the former are used to cut branches singly, whereas the latter are used to cut twiggy branches, leaves or shrubs or hedges and grass in a wholesale manner, a number being cut at each closing of the blades. In all secateurs and shears, when fully opened the apex of the jaw is an angle formed by either straight or curved lines. This angle is generally an acute angle, rarely a right angle and very rarely an obtuse angle. Whatever the angle when the secateurs or shears are put into action the point of contact between the object and the blade at the apex made by the blade and guard (or two blades in double edged tools) travel from the apex along the blade and guard or blades to the tip or tips thereof. The exception to this is made by the double edged tools in which the tips of the blades cross over, but in this case the contact commencing from the apex travels along the blades to near the middle where it is spent by the second contact made by the crossing tips, which meet it from an opposite direction, consequently a branch to be cut is pushed along the concave guard or blade towards the middle where the convex blade approaches at approximately right angles, and cuts it.

My invention is an improvement in the form of the cutting blade of secateurs for use in horticulture designated to cut more in the direction of the longitudinal axis of the implement rather than of the transverse axis.

According to the invention the convex cutting blade is made with a convex bulge of such an extent as to comprise a rounded flattened apex at about the centre of the edge of the blade, receding sharply towards the point and base and near the base receding into a deep re-entry to cause the blade when cutting to act in a direction towards the junction of the two blades instead of across the blades at right angles. In a modification a second re-entering or concave curve is provided between the centre and the tip to form a second cutting cavity between it and the concave jaw, The invention will be fully described with reference to the accompanying drawings.

Fig. 1. is a side elevation of pruning secateurs fully open.

Fig. 2. is a side elevation closed.

Fig. 3. is a side elevation closed showing the blade overlapping the concave guard.

Fig. 4. is a side elevation partially closed.

Fig. 5. is a side elevation of blade D detached.

Fig. 6. is a side elevation of blade and guard detached showing a modified curve for both.

Fig. 7. is a side elevation of another construction of pruning secateurs.

Fig. 8. is a side elevation showing modification of convex blade D' with two re-entering concave curves and concave detachable blade E'.

Fig. 9. is a side elevation of same closed.

Fig. 10. is a side elevation showing reverse side of detachable concave blade E'.

The secateurs are constructed with two handles A and B pivoted together with a spring C, a cutting blade affixed to one handle and a concave guard or blade extending from or affixed to the other handle in known manner.

According to the invention as shown in Figs. 1 to 7 the cutting blade D is formed with a deep convex bulge projecting from the center of the cutting edge receding sharply at $d^1$ and $d$ to the point and base of the blade forming a flattened apex and receding at the base into a deep concave re-entry $d$ which forms a circular cavity between the blade D and guard E at the apex where the two join, and as shown in Figs. 8 and 9 the convex blade $D^1$ is formed with a convex bulge at $d^1$ projecting from about the centre of the blade receding into two re-entering concave recesses $d^3$ at the point and at the base.

In use the secateurs when open present a wider space and a more or less circular cavity between the cutting blade D and the concave guard E or blade E' at the apex to receive the subject to be cut, and as they close the blade meets the subject with a more direct cut in a direction towards the junction of the blade and guard which prevents it moving forward along the blade. The guard or concave blade may also be more concave at the lower end $e$ as shown in Fig. 6, so that the gripping and consequent cutting may commence almost if not wholly at the very apex of the jaws, which is not feasible with secateurs with the present shape of blade.

When the secateurs are closed the blade D or D' will not wholly cover the lower part of the concave guard or blade at e' but may cover the upper part and lie flush with the edge as in Fig. 2 or overlap it from the centre towards the tip as in Fig. 3, or may leave it uncovered at e' and e² as in Fig. 9.

This construction allows branches to be cut in close proximity to the apex of the jaws within 3/32nds of an inch of it which is not possible with any other secateur or shears. The action of ordinary secateurs or shears at the apex is scissor like and whether the blade is concave and the guard or second blade concave or convex, or both straight, or again both made up of slight concave and convex lines, this scissor action remains. The branch being cut is always some considerable distance from the apex of the jaws before being cut through, and although the action of my secateurs may commence in a scissor like manner this action ceases almost immediately because the blade and guard or two blades grip and cut the branch in a direction towards the apex of the jaws.

I consider that the bulging construction of blade gives with the deep re-entering cavity d much greater facility in cutting more particularly in awkward positions with greater power than is possible with the fore part of the blade, allowing the use of practically the whole of the blade in pruning whereas in the ordinary secateurs and shears the use of the apex portion is impractical, also a much longer working life for the blade is obtained and greater facilities in sharpening than is possible in ordinary secateurs. And further, that the construction shown in Figs. 8 and 9 with the additional concave or re-entering cavity $d^3$ in conjunction with a concave blade E is particularly applicable for pruning climbing, and rambler roses and other subjects which have to be pruned level with or even under the surface of the soil.

What I claim as my invention and desire to protect by Letters Patent is:—

In secateurs for pruning, a cutting blade comprising a bulge projecting from the cutting edge, a cutting edge receding therefrom at an acute inclination towards the point, a cutting edge receding therefrom at an acute inclination towards the base, the two forming therewith a flattened apex about the centre of the cutting edge and a deep re-entering cavity at the base merging into the inclined cutting edge.

In testimony whereof I have hereunto set my hand.

CECIL ALBERT JARDINE.